US010449481B2

(12) United States Patent
Yukumoto et al.

(10) Patent No.: US 10,449,481 B2
(45) Date of Patent: Oct. 22, 2019

(54) $CO_2$ RECOVERY UNIT AND $CO_2$ RECOVERY METHOD

(71) Applicant: MITSUBISHI HEAVY INDUSTRIES, LTD., Tokyo (JP)

(72) Inventors: Atsuhiro Yukumoto, Tokyo (JP); Takuya Hirata, Tokyo (JP); Hiroshi Tanaka, Tokyo (JP); Akiyori Hagimoto, Tokyo (JP); Haruaki Hirayama, Tokyo (JP); Tsuyoshi Oishi, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 174 days.

(21) Appl. No.: 15/119,023

(22) PCT Filed: Oct. 7, 2014

(86) PCT No.: PCT/JP2014/076817
§ 371 (c)(1),
(2) Date: Aug. 15, 2016

(87) PCT Pub. No.: WO2015/122050
PCT Pub. Date: Aug. 20, 2015

(65) Prior Publication Data
US 2016/0361682 A1 Dec. 15, 2016

(30) Foreign Application Priority Data
Feb. 17, 2014 (JP) .................................. 2014-027889

(51) Int. Cl.
*B01D 53/14* (2006.01)
(52) U.S. Cl.
CPC ..... *B01D 53/1412* (2013.01); *B01D 53/1406* (2013.01); *B01D 53/1425* (2013.01);
(Continued)

(58) Field of Classification Search
CPC ........ B01D 2258/0283; B01D 53/1406; B01D 53/1412; B01D 53/1425; B01D 53/1475; Y02A 50/2342; Y02C 10/06
See application file for complete search history.

(56) References Cited

U.S. PATENT DOCUMENTS

| 4,548,620 | A | * | 10/1985 | Albiol | ................ | B01D 53/1456 |
| | | | | | | 423/228 |
| 2013/0333559 | A1 | * | 12/2013 | Nakagawa | ......... | B01D 53/1412 |
| | | | | | | 95/24 |
| 2014/0252699 | A1 | | 9/2014 | Sakaguchi et al. | | |

FOREIGN PATENT DOCUMENTS

JP 11-137960 A 5/1999
JP 2010-100491 A 5/2010
(Continued)

OTHER PUBLICATIONS

Machine translation JP 2010100491 accessed Apr. 30, 2018.*
(Continued)

*Primary Examiner* — Cabrena Holecek
(74) *Attorney, Agent, or Firm* — Westerman, Hattori, Daniels & Adrian, LLP

(57) ABSTRACT

A $CO_2$ recovery unit and a $CO_2$ recovery method capable of having an excellent $CO_2$ absorption rate and saving energy are provided. A $CO_2$ recovery unit of the invention includes: a $CO_2$ absorber which includes an upper $CO_2$ absorption unit obtaining a $CO_2$ absorbent by causing a flue gas containing $CO_2$ to contact a $CO_2$ absorbent and a lower $CO_2$ absorption unit obtaining a $CO_2$ absorbent by causing the $CO_2$ absorbent to contact a flue gas containing $CO_2$; a $CO_2$ absorbent regenerator which obtains the $CO_2$ absorbent by heating the $CO_2$ absorbent a thermometer which measures a temperature of the $CO_2$ absorbent supplied from the $CO_2$ absorber to the $CO_2$ absorbent regenerator; and a control device which controls a temperature of the $CO_2$ absorbent supplied to the (Continued)

lower $CO_2$ absorption unit based on the temperature of the $CO_2$ absorbent measured by the thermometer.

3 Claims, 3 Drawing Sheets

(52) U.S. Cl.
CPC .. *B01D 53/1475* (2013.01); *B01D 2258/0283* (2013.01); *Y02C 10/06* (2013.01)

(56) References Cited

FOREIGN PATENT DOCUMENTS

| | | | | | |
|---|---|---|---|---|---|
| JP | 2010100491 | A | * | 5/2010 | |
| JP | 2010-275582 | A | | 12/2010 | |
| JP | 2010275582 | A | * | 12/2010 | |
| JP | 2012-179520 | A | | 9/2012 | |
| JP | 2013-108109 | A | | 6/2013 | |
| JP | 2014-24011 | A | | 2/2014 | |
| JP | 2014024011 | A | * | 2/2014 | B01D 53/62 |
| SU | 1261698 | A1 | | 10/1986 | |

OTHER PUBLICATIONS

Machine translation JP 2014024011 accessed Apr. 30, 2018.*
Machine translation JP 2010275582 accessed Apr. 30, 2018.*
Office Action dated Jun. 6, 2017, issued in counterpart Japanese application No. 2014-027889, with English machine translation. (5 pages).
Miyazaki, "Essential Knowledge for understanding LNG Business", (http://oilgas-info.jogmec.go.jp/pdf/0/598/200503_001a.pdf), cited in Specification, w/English partial translation (26 pages).
International Search Report dated Nov. 4, 2014, issued in counterpart International Application No. PCT/JP2014/076817, w/English translation (4 pages).
Written Opinion dated Nov. 4, 2014, issued in counterpart International Application No. PCT/JP2014/076817 (4 pages).
Translation of Written Opinion dated Nov. 4, 2014, issued in counterpart International Application No. PCT/JP2014/076817 (5 pages).
Office Action dated Nov. 16, 2017, issued in counterpart Russian Application No. 2016133516, with English anslation. (14 pages).

* cited by examiner

CO$_2$ RECOVERY UNIT AND CO$_2$ RECOVERY METHOD

FIELD

The present invention relates to a CO$_2$ recovery unit and a CO$_2$ recovery method and particularly to a CO$_2$ recovery unit and a CO$_2$ recovery method which recover CO$_2$ in a gas to be treated by using a CO$_2$ absorbent.

BACKGROUND

Hitherto, there has been proposed a direct-reduced iron reduction system including an acid gas removing device for removing an acid element in a reducing furnace flue gas corresponding to a synthetic gas discharged from a direct reducing furnace (for example, see Patent Literature 1). In this direct-reduced iron reduction system, the reducing furnace flue gas having a high CO$_2$ partial pressure (for example, 50 kPa to 200 kPa) and discharged from the direct reducing furnace is caused to contact an acid gas absorbent in an acid gas element-absorber so that an acid gas element in the reducing furnace flue gas is removed therefrom. The acid gas absorbent having the acid gas element absorbed thereto is heated in a regenerator to discharge the acid gas element in the acid gas absorbent therefrom so that the acid gas absorbent is regenerated. Further, there is also proposed an acid gas removing facility which removes an acid element contained in a natural gas (for example, see Non Patent-Literature 1).

CITATION LIST

Patent Literature

Patent Literature 1: Japanese Laid-open Patent Publication No. 2013-108109

Non Patent Literature

Non Patent Literature 1: Liquefying Plant Essential Knowledge for Understanding LNG Business (oilgas-info.jog-mec.go.jp/pdf/0/598/200503_001a.pdf)

SUMMARY

Technical Problem

Incidentally, a CO$_2$ recovery unit which recovers CO$_2$ in a combustion flue gas having a relatively low CO$_2$ partial pressure (for example, 10 kPa to 15 kPa) and discharged from a boiler or the like by using a CO$_2$ absorbent is used in a thermal power station or the like. Likewise, various methods have been examined in order to save energy. In recent years, it is desirable to develop a technology capable of having a small CO$_2$ recovery heat amount involved with a steam consumption amount and realizing energy saving even when CO$_2$ in a synthetic gas having a relatively high CO$_2$ partial pressure is recovered by a CO$_2$ absorbent or CO$_2$ in a natural gas (a methane gas) containing CO$_2$ is recovered by a CO$_2$ absorbent.

This invention is contrived in view of such circumstances and an object of the invention is to provide a CO$_2$ recovery unit and a CO$_2$ recovery method capable of both having an excellent CO$_2$ absorption rate and saving energy.

Solution to Problem

A CO$_2$ recovery unit according to the present invention comprising: a CO$_2$ absorber which includes a first CO$_2$ absorption unit obtaining a first CO$_2$ absorbent by causing a CO$_2$ containing gas to be treated to contact a CO$_2$ absorbent so that CO$_2$ contained in the gas to be treated is absorbed to the CO$_2$ absorbent and a second CO$_2$ absorption unit obtaining a second CO$_2$ absorbent by causing the first CO$_2$ absorbent to contact a CO$_2$ containing gas to be treated so that CO$_2$ contained in the gas to be treated is absorbed to the first CO$_2$ absorbent; a CO$_2$ absorbent regenerator which regenerates a CO$_2$ absorbent by heating the second CO$_2$ absorbent so that CO$_2$ is discharged from the second CO$_2$ absorbent; a temperature measurement device which measures a temperature of the second CO$_2$ absorbent supplied from the CO$_2$ absorber to the CO$_2$ absorbent regenerator; and a control device which controls a temperature of the first CO$_2$ absorbent supplied to the second CO$_2$ absorption unit based on the temperature of the second CO$_2$ absorbent measured by the temperature measurement device.

According to this configuration, since the temperature of the first CO$_2$ absorbent supplied to the second CO$_2$ absorption unit is controlled based on the temperature of the second CO$_2$ absorbent supplied to the CO$_2$ absorbent regenerator, the CO$_2$ absorption rate of the CO$_2$ absorbent in the second CO$_2$ absorption unit can be increased. Accordingly, the CO$_2$ recovery unit can have an excellent CO$_2$ absorption rate and save energy even when a synthetic gas having a high CO$_2$ partial pressure in a gas to be treated is treated. Here, the absorption rate indicates a CO$_2$ absorption molar amount per 1 mol of an absorbent.

In the CO$_2$ recovery unit according to present invention, it is preferable that the control device controls the temperature of the first CO$_2$ absorbent supplied to the second CO$_2$ absorption unit so that the temperature is equal to or higher than 50° C. and equal to or lower than 60° C. With this configuration, since the CO$_2$ recovery unit controls the temperature of the first CO$_2$ absorbent supplied to the second CO$_2$ absorption unit within an appropriate range, the CO$_2$ absorption rate of the gas to be treated in the second CO$_2$ absorption unit is further improved and the circulation amount of the CO$_2$ absorbent can be decreased in accordance with the improved CO$_2$ absorption rate. Accordingly, the amount of steam necessary to regenerate the CO$_2$ absorbent can be decreased. With this configuration, the temperature of the CO$_2$ absorbent supplied to the CO$_2$ absorbent regenerator can be appropriately increased and thus an effect of decreasing a steam consumption amount is expected.

In the CO$_2$ recovery unit according to present invention, it is preferable that a CO$_2$ partial pressure of the CO$_2$ containing gas to be treated is 50 kPa or more. With this configuration, since the CO$_2$ recovery unit controls the CO$_2$ partial pressure in the gas to be treated within an appropriate range, the CO$_2$ absorption rate using the first CO$_2$ absorbent in the second CO$_2$ absorption unit is further improved.

In the CO$_2$ recovery unit according to present invention, it is preferable that a ratio (the first CO$_2$ absorption unit:the second CO$_2$ absorption unit) between a filling material charging height in the first CO$_2$ absorption unit and a filling material charging height in the second CO$_2$ absorption unit is equal to or larger than 1:3 and equal to or smaller than 3:1. With this configuration, since the CO$_2$ absorption rate in the gas to be treated using the CO$_2$ absorbent is further improved, energy can be saved.

A CO$_2$ recovery method according to the present invention comprising: obtaining a first CO$_2$ absorbent by causing a CO$_2$ containing gas to be treated to contact a CO$_2$ absorbent in a first CO$_2$ absorption unit of a CO$_2$ absorber so that CO$_2$ contained in the gas to be treated is absorbed to the CO$_2$ absorbent and obtaining a second $CO_2$ absorbent by causing the first $CO_2$ absorbent to contact the $CO_2$ containing gas to be treated in a second $CO_2$ absorption unit of the $CO_2$ absorber so that $CO_2$ contained in the gas to be treated is absorbed to the first $CO_2$ absorbent; regenerating a $CO_2$ absorbent by heating the second $CO_2$ absorbent in a $CO_2$ absorbent regenerator so that $CO_2$ is discharged from the $CO_2$ absorbent; and measuring a temperature of the second $CO_2$ absorbent supplied from the $CO_2$ absorber to the $CO_2$ absorbent regenerator and controlling a temperature of the first $CO_2$ absorbent supplied to the second $CO_2$ absorption unit based on the measured temperature of the second $CO_2$ absorbent.

According to this method, since the temperature of the first $CO_2$ absorbent supplied to the second $CO_2$ absorption unit is controlled based on the temperature of the second $CO_2$ absorbent supplied to the $CO_2$ absorbent regenerator, the $CO_2$ absorption rate of the $CO_2$ absorbent in the second $CO_2$ absorption unit can be increased. Accordingly, the $CO_2$ recovery method can have an excellent $CO_2$ absorption rate and save energy even when a synthetic gas having a high $CO_2$ partial pressure in a gas to be treated is treated.

In the $CO_2$ recovery method according to present invention, it is preferable that the temperature of the first $CO_2$ absorbent supplied to the second $CO_2$ absorption unit is controlled so that the temperature is equal to or higher than 50° C. and equal to or lower than 60° C. With this method, since the $CO_2$ recovery unit controls the temperature of the first $CO_2$ absorbent supplied to the second $CO_2$ absorption unit within an appropriate range, the $CO_2$ absorption rate of the gas to be treated in the second $CO_2$ absorption unit is further improved and the circulation amount of the $CO_2$ absorbent can be decreased in accordance with the improved $CO_2$ absorption rate. Accordingly, the amount of steam necessary to regenerate the $CO_2$ absorbent can be decreased. With this configuration, the temperature of the $CO_2$ absorbent supplied to the $CO_2$ absorbent regenerator can be appropriately increased and thus an effect of decreasing a steam consumption amount is expected.

In the $CO_2$ recovery method according to present invention, it is preferable that a $CO_2$ partial pressure of the $CO_2$ containing gas to be treated is 50 kPa or more. With this method, since the $CO_2$ recovery method controls the $CO_2$ partial pressure in the gas to be treated within an appropriate range, the $CO_2$ absorption rate in the gas to be treated using the first $CO_2$ absorbent in the second $CO_2$ absorption unit is further improved.

In the $CO_2$ recovery method according to present invention, it is preferable that a ratio (the first $CO_2$ absorption unit:the second $CO_2$ absorption unit) between a filling material charging height in the first $CO_2$ absorption unit and a filling material charging height in the second $CO_2$ absorption unit is equal to or larger than 1:3 and equal to or smaller than 3:1. With this method, since the $CO_2$ absorption rate in the gas to be treated using the $CO_2$ absorbent is further improved, energy can be saved.

Advantageous Effects of Invention

According to the invention, it is possible to realize a $CO_2$ recovery unit and a $CO_2$ recovery method both having an excellent $CO_2$ absorption rate and realizing energy saving.

DESCRIPTION OF EMBODIMENTS

The present inventors have paid attention to a conventional $CO_2$ recovery unit which recovers $CO_2$ from a gas having a relatively low $CO_2$ partial pressure (for example, 10 kPa to 15 kPa) such as a combustion flue gas discharged from a boiler of a thermal power station and does not recover $CO_2$ from a synthetic gas having a relatively high $CO_2$ partial pressure (for example, 50 kPa to 200 kPa) and discharged from a direct reducing furnace. Then, the present inventors have found that a $CO_2$ recovery unit and a $CO_2$ recovery method capable of both having an excellent $CO_2$ absorption rate and saving energy are obtained by a configuration in which a $CO_2$ absorber is provided with a plurality of $CO_2$ absorption units and a temperature of a $CO_2$ absorbent supplied to the plurality of $CO_2$ absorption units is controlled based on a temperature of a $CO_2$ absorbent supplied to a $CO_2$ absorbent regenerator when $CO_2$ is recovered from a synthetic gas having a relatively high $CO_2$ partial pressure, whereby the invention is obtained.

Hereinafter, an embodiment of the invention will be described in detail with reference to the accompanying drawings. The invention is not limited to the embodiments below and can be appropriately modified. Further, the components of the $CO_2$ recovery unit according to the embodiments below can be appropriately combined with one another.

Figure 1:
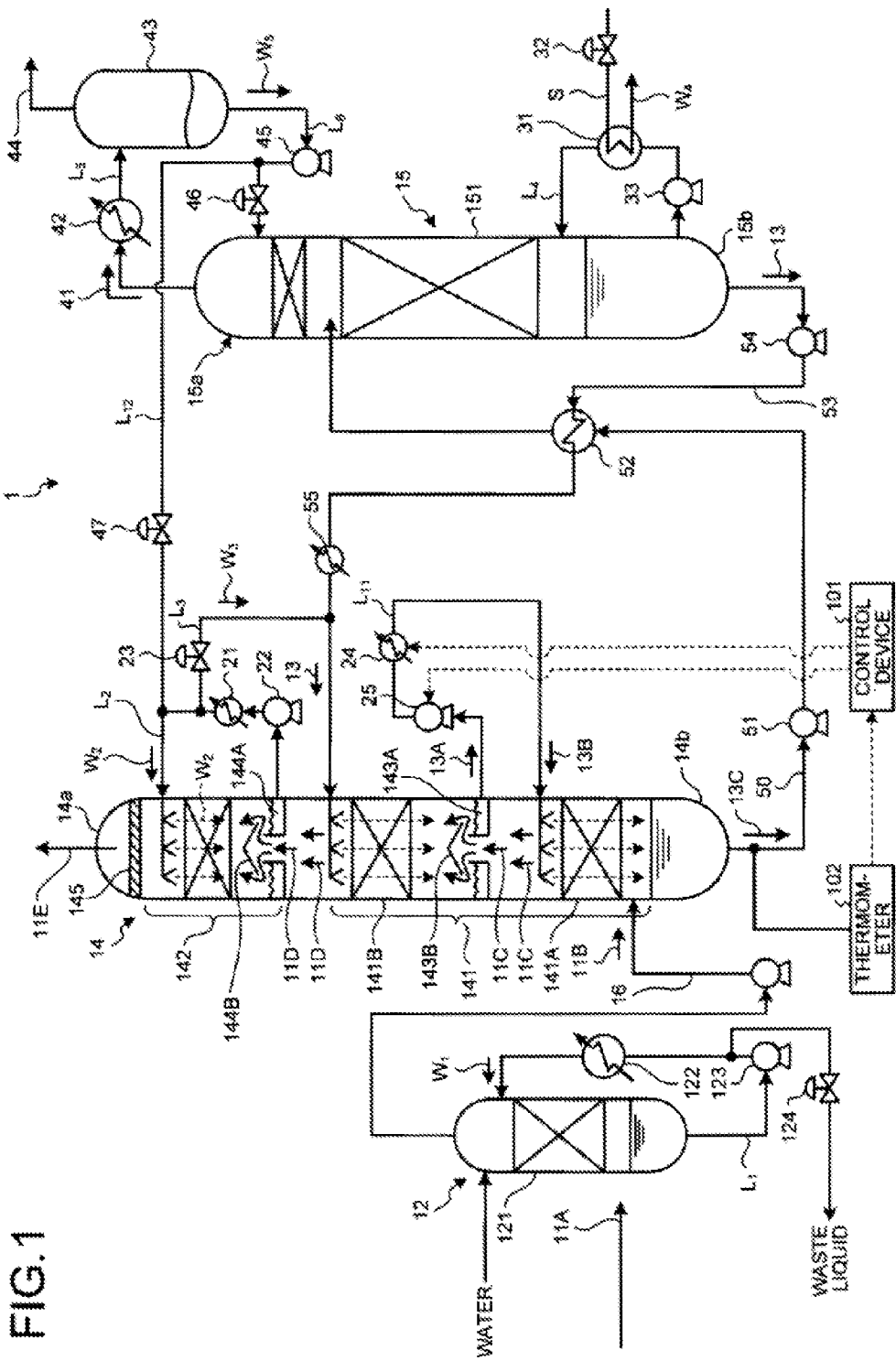
FIG. 1 is a schematic diagram illustrating a $CO_2$ recovery unit according to an embodiment of the invention.

FIG. 1 is a schematic diagram illustrating a $CO_2$ recovery unit according to an embodiment of the invention. As illustrated in FIG. 1, a $CO_2$ recovery unit 1 is an apparatus which recovers $CO_2$ in a reducing furnace flue gas (a gas to be treated) 11A, corresponding to a synthetic gas discharged from a direct reducing furnace, in the form of a high-concentration $CO_2$ gas. The $CO_2$ recovery unit 1 includes a cooling tower 12 which cools a flue gas 11A containing $CO_2$ discharged from a direct reducing furnace, a $CO_2$ absorber 14 which is provided at a rear stage of the cooling tower 12 and causes the cooled flue gas 11A to contact a $CO_2$ absorbent 13 so that $CO_2$ in the flue gas 11A is absorbed to the $CO_2$ absorbent 13 to be removed from the flue gas, and a $CO_2$ absorbent regenerator 15 which is provided at a rear stage of the $CO_2$ absorber 14 and discharges $CO_2$ from a $CO_2$ absorbent 13C having $CO_2$ absorbed thereto to regenerate the $CO_2$ absorbent 13.

In the $CO_2$ recovery unit 1, the $CO_2$ absorbent 13 is circulated between the $CO_2$ absorber 14 and the $CO_2$ absorbent regenerator 15. The $CO_2$ absorbent 13 (a lean solution) is supplied as the $CO_2$ absorbent 13C having $CO_2$ absorbed thereto (a rich solution) in the $CO_2$ absorber 14 to the $CO_2$ absorbent regenerator 15. Further, $CO_2$ is removed from the $CO_2$ absorbent 13C (the rich solution) by the $CO_2$ absorbent regenerator 15 and a resultant gas is supplied as the regenerated $CO_2$ absorbent 13 (the lean solution) to the $CO_2$ absorber 14.

The cooling tower 12 includes a cooling unit 121 which cools the flue gas 11A. Further, a circulation line $L_1$ is provided between a bottom portion of the cooling tower 12 and a top portion of the cooling unit 121. The circulation line $L_1$ is provided with a heat exchanger 122 which cools cooling water $W_1$, a circulation pump 123 which circulates the cooling water $W_1$ in the direction line $L_1$, and an adjustment valve 124 which adjusts the amount of a waste liquid separated as a liquid from the circulation line $L_1$ and discharged therefrom.

In the cooling unit 121, the flue gas 11A is cooled by a counterflow contact between the flue gas 11A and the cooling water $W_1$ and thus a cooled flue gas 11B is obtained. The heat exchanger 122 cools the cooling water $W_1$ which is heated by exchanging heat with the flue gas 11A. The circulation pump 123 supplies the cooling water $W_1$ flowing down to the bottom portion of the cooling tower 12 through the heat exchanger 122 to a top portion of the cooling unit 121. In the cooling tower 12, when the amount of moisture in the flue gas 11A is small, a liquid level of the cooling tower 12 decreases and thus water is supplied from a tower top portion. Further, when the amount of the moisture in the flue gas 11A is large, the liquid level of the cooling tower 12 increases and thus a part of the cooling water $W_1$ circulated in the circulation line $L_1$ is separated as waste liquid.

The $CO_2$ absorber 14 includes a $CO_2$ absorption unit 141 which is provided in a lower portion of the $CO_2$ absorber 14 and to which the $CO_2$ absorbent 13 and the flue gas 11B cooled by the cooling tower 12 are supplied, and a water washing unit 142 which is provided in an upper portion of the $CO_2$ absorber 14.

The $CO_2$ absorption unit 141 includes a lower $CO_2$ absorption unit (a second $CO_2$ absorption unit) 141A which is provided in a lower portion of the $CO_2$ absorption unit 141 and an upper $CO_2$ absorption unit 141B (a first $CO_2$ absorption unit) which is provided in an upper portion of the $CO_2$ absorption unit 141. A filling material is charged into the lower $CO_2$ absorption unit 141A at a charging height H1. A filling material is charged into the upper $CO_2$ absorption unit 141B at a charging height H2. The $CO_2$ absorbent 13 which is regenerated by the $CO_2$ absorbent regenerator 15 is supplied to the upper $CO_2$ absorption unit 141B. A $CO_2$ absorbent 13B which absorbs $CO_2$ in a flue gas 11C by the upper $CO_2$ absorption unit 141B is supplied to the lower $CO_2$ absorption unit (the second $CO_2$ absorption unit) 141A.

A liquid storage unit 143A, which stores a $CO_2$ absorbent (a first $CO_2$ absorbent) 13A flowing down from the upper $CO_2$ absorption unit 141B and staying at a lower portion of the upper $CO_2$ absorption unit 141B, and a chimney tray 143B are provided between the lower $CO_2$ absorption unit 141A and the upper $CO_2$ absorption unit 141B. The liquid storage unit 143A is provided with an extraction line $L_{11}$ which extracts the $CO_2$ absorbent 13A stored in the liquid storage unit 143A from the $CO_2$ absorber 14 and supplies the liquid to the lower $CO_2$ absorption unit 141A.

The extraction line $L_{11}$ is provided with a heat exchanger 24 which cools the $CO_2$ absorbent 13A to obtain the cooled $CO_2$ absorbent 13B and a pump 25 which supplies the $CO_2$ absorbent 13B as the $CO_2$ absorbent 13B to the lower $CO_2$ absorption unit 141A. The heat exchanger 24 is configured to adjust a refrigerant supply amount by a control device 101. Further, the pump 25 is configured to adjust the amount of the $CO_2$ absorbent 13B supplied to the lower $CO_2$ absorption unit 141A by the control device 101. The control device 101 can be realized by, for example, a general or dedicated computer such as a CPU (Central Processing Unit), a ROM (Read Only Memory)/and a RAM (Random Access Memory) and a program operated on this computer.

A bottom portion of the water washing unit 142 is provided with a liquid storage unit 144A which stores washing water $W_2$ for washing a flue gas 11D obtained by removing $CO_2$ therefrom in the flue gas 11C. A circulation line $L_2$ which supplies the washing water $W_2$ containing the $CO_2$ absorbent 13 recovered by the liquid storage unit 144A from a top portion of the water washing unit 142 so that the washing water is circulated is provided between the liquid storage unit 144A and the water washing unit 142. The circulation line $L_2$ is provided with a heat exchanger 21 which cools the washing water $W_2$ and a circulation pump 22 which circulates the washing water $W_2$ containing the $CO_2$ absorbent 13 recovered by the liquid storage unit 144A through the heat exchanger 21 so that the washing water is circulated in the circulation line $L_2$. Further, the circulation line $L_2$ is provided with an extraction line $L_3$ which extracts a part (washing water $W_3$) of the washing water $W_2$ and supplies the water to the $CO_2$ absorbent 13 (the lean solution). The extraction line $L_3$ is provided with an adjustment valve 23 which adjusts the amount of the washing water $W_3$ supplied to the $CO_2$ absorbent 13.

In the $CO_2$ absorption unit 141, a counterflow contact between the flue gas 11A containing $CO_2$ by the upper $CO_2$ absorption unit 141B and the $CO_2$ absorbent 13 containing alkanolamine occurs. Accordingly, $CO_2$ in the flue gas 11C is absorbed to the $CO_2$ absorbent 13 by a chemical reaction expressed in the following formula. As a result, $CO_2$ in the flue gas 11C is removed so that the flue gas 11C becomes the flue gas 11D obtained by removing $CO_2$ therefrom and the $CO_2$ absorbent 13 becomes the $CO_2$ absorbent 13A. Then, in the lower $CO_2$ absorption unit 141A, a counterflow contact between the flue gas 11B containing $CO_2$ and the $CO_2$ absorbent 13B having $CO_2$ absorbed thereto occurs. Accordingly, $CO_2$ in the flue gas 11B is absorbed to the $CO_2$ absorbent 13B by the chemical reaction expressed in the following formula. As a result, $CO_2$ in the flue gas 11B is removed so that the flue gas 11B becomes the flue gas 11C of which a $CO_2$ concentration is decreased and the $CO_2$ absorbent 13B becomes the $CO_2$ absorbent 13C. In this way, when the flue gas 11B containing $CO_2$ passes through the $CO_2$ absorption unit 141, the flue gas 11D obtained by removing $CO_2$ therefrom is obtained. Further, the $CO_2$ absorbent 13 absorbs $CO_2$ to become the $CO_2$ absorbent 13B (the semi-rich solution) in the upper $CO_2$ absorption unit 141B and the $CO_2$ absorbent 13B further absorbs $CO_2$ to become the $CO_2$ absorbent 13C (the rich solution) in the lower $CO_2$ absorption unit 141A.

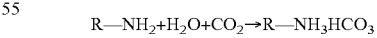

$$R-NH_2 + H_2O + CO_2 \rightarrow R-NH_3HCO_3$$

In the water washing unit 142, the flue gas 11D obtained by removing $CO_2$ therefrom after passing through the upper $CO_2$ absorption unit 141B rises through a chimney tray 144B. Then, a gas-liquid contact occurs between the flue gas 11D and the washing water $W_2$ supplied from the top portion of the water washing unit 142 so that a flue gas 11B is obtained by recovering the $CO_2$ absorbent 13 accompanied by the flue gas 11D through circulating and washing processes. After mist in the flue gas 11E is trapped by a mist eliminator 145, the flue gas is discharged to the outside from a tower top portion 14a of the $CO_2$ absorber 14.

A rich solution supply pipe 50 which supplies the $CO_2$ absorbent 13C having $CO_2$ absorbed thereto (the rich solution) in the $CO_2$ absorber 14 to an upper portion of the $CO_2$ absorbent regenerator 15 is provided between a tower bottom portion 14b of the $CO_2$ absorber 14 and the upper portion of the $CO_2$ absorbent regenerator 15. The rich solution supply pipe 50 is provided with a thermometer (a temperature measurement device) 102 which measures a temperature of the $CO_2$ absorbent 13C, a rich solution pump 51 which supplies the $CO_2$ absorbent 13C having $CO_2$ absorbed thereto in the $CO_2$ absorber 14 to the $CO_2$ absorbent regenerator 15, and a rich-lean solution heat exchanger 52 which heats the $CO_2$ absorbent 13C by the $CO_2$ absorbent 13 (the lean solution) heated by the $CO_2$ absorbent regenerator 15 to remove $CO_2$ therefrom. The control device 101 adjusts the amount of a refrigerant supplied to the heat exchanger 24 based on a temperature of the $CO_2$ absorbent 13C measured by the thermometer 102 and controls the amount of the $CO_2$ absorbent 13B supplied to the lower $CO_2$ absorption unit 141A by the pump 25. Additionally, the thermometer 102 may be provided at a position where the $CO_2$ absorbent 13B supplied to the lower $CO_2$ absorption unit 141A can be controlled by the control device 101. For example, the thermometer may be provided at a rear stage of the heat exchanger 24 of the extraction line $L_{11}$.

A $CO_2$ absorbent supply unit 151 to which the $CO_2$ absorbent 13C having $CO_2$ absorbed thereto is supplied is provided at a enter portion of the $CO_2$ absorbent regenerator 15. A tower bottom portion 15b of the $CO_2$ absorbent regenerator 15 is provided with a circulation line $L_4$ which circulates the $CO_2$ absorbent 13C flowing down to the tower bottom portion. The circulation line $L_4$ is provided with a regenerating heater 31 which heats the $CO_2$ absorbent 13 by saturated steam S, an adjustment valve 32 which supplies the saturated steam S to the regenerating heater 31, and a circulation pump 33 which supplies the $CO_2$ absorbent 13 of a tower bottom portion of the $CO_2$ absorbent regenerator 15 to a lower portion of the $CO_2$ absorbent supply unit 151 of the $CO_2$ absorbent regenerator 15 through the regenerating heater 31.

A tower top portion 15a of the $CO_2$ absorbent regenerator 15 is provided with a gas discharge line $L_5$ which discharges a $CO_2$ gas 41 accompanying steam. The gas discharge line $L_5$ is provided with a condenser 42 which condenses moisture in the $CO_2$ gas 41 and a separation drum 43 which separates water $W_5$ condensed by the $CO_2$ gas 41. A $CO_2$ gas 44 from which the condensed water $W_5$ is separated is discharged to the outside from the upper portion of the separation drum 43. A condensed water line $L_6$ which supplies the condensed water $W_5$ separated in the separation drum 43 to an upper portion of the $CO_2$ absorbent regenerator 15 is provided between the bottom portion of the separation drum 43 and the upper portion of the $CO_2$ absorbent regenerator 15. The condensed water line $L_6$ is provided with a condensed water circulation pump 45 which supplies the condensed water $W_5$ separated in the separation drum 43 to the upper portion of the $CO_2$ absorbent regenerator 15. An adjustment valve 46 which controls the amount of the condensed water $W_5$ supplied to the $CO_2$ absorbent regenerator 15 is provided between the condensed water circulation pump 45 and the $CO_2$ absorbent regenerator 15. Further, a re-circulation line $L_{12}$ which divides a part of the condensed water $W_5$ supplied to the $CO_2$ absorbent regenerator 15 and re-circulates the condensed water $W_5$ supplied to the water washing unit 142 of the $CO_2$ absorber 14 is provided between the condensed water circulation pump 45 and the circulation line $L_2$. The re-circulation line $L_{12}$ is provided with an adjustment valve 47 which adjusts the amount of the condensed water $W_5$ supplied to the water washing unit 142.

Further, the tower bottom portion of the $CO_2$ absorbent regenerator 15 and the upper portion of the $CO_2$ absorption unit 141 of the $CO_2$ absorber 14 are provided with a lean solution supply pipe 53 which supplies the $CO_2$ absorbent 13 (the lean solution) of the tower bottom portion of the $CO_2$ absorbent regenerator 15 to the upper portion of the $CO_2$ absorption unit 141. The lean solution supply pipe 53 is provided with the rich-lean solution heat exchanger 52 which heats the $CO_2$ absorbent 13C having $CO_2$ absorbed thereto (the rich solution) by the $CO_2$ absorbent 13 (the lean solution) heated by the steam in the $CO_2$ absorbent regenerator 15 so that $CO_2$ is removed therefrom, a lean solution pump 54 which supplies the $CO_2$ absorbent 13 of the tower bottom portion of the $CO_2$ absorbent regenerator 15 to the upper portion of the $CO_2$ absorption unit 141, and a cooling unit 55 which cools the $CO_2$ absorbent 13 (the lean solution) to a predetermined temperature.

Figure 2:
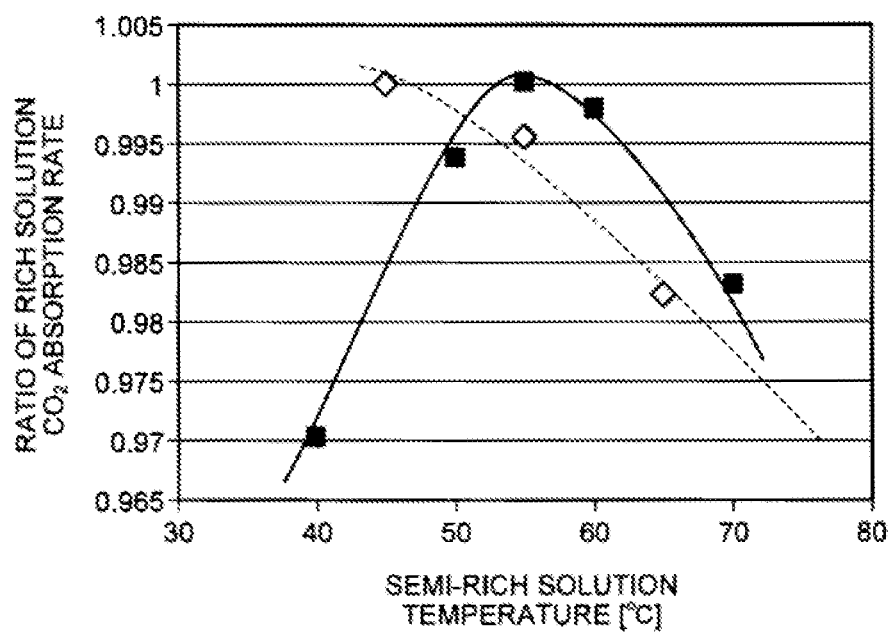
FIG. 2 is a diagram illustrating a relation between a temperature of a $CO_2$ absorbent (a semi-rich solution) supplied to a lower $CO_2$ absorption unit and a ratio of a $CO_2$ absorption rate of a rich solution.

Next, a relation between a $CO_2$ absorption rate and a temperature of the $CO_2$ absorbent 13B supplied to the lower $CO_2$ absorption unit 141A of the $CO_2$ absorber 14 in the $CO_2$ recovery unit 1 according to the embodiment will be described with reference to FIG. 2. FIG. 2 is a diagram illustrating a relation between the temperature of the $CO_2$ absorbent 13B (the semi-rich solution) supplied to the lower $CO_2$ absorption unit and a ratio of the $CO_2$ absorption rate of the rich solution. Additionally, in FIG. 2, a horizontal axis indicates the temperature of the $CO_2$ absorbent 13B and a vertical axis indicates the ratio of the $CO_2$ absorption rate of the rich solution. Further, in FIG. 2, a case where a flue gas having a low $CO_2$ partial pressure (for example, about 10 kPa) such as a combustion flue gas discharged from a boiler is used is indicated by a dotted line and a case where a flue gas having a high $CO_2$ partial pressure (for example, about 60 kPa) such as a synthetic gas discharged from a direct reducing furnace is used is indicated by a solid line. Additionally, a plot indicates an analysis value. Further, in FIG. 2, the flue gas having a low $CO_2$ partial pressure and the flue gas having a high $CO_2$ partial pressure are displayed on the same axes at a ratio in which a maximal value of the absorption rate is 1 in a temperature range equal to or higher than 40° C. and equal to or lower than 70° C., but have different maximal values of the absorption rates.

As indicated by the dotted line of FIG. 2, when the flue gas having a low $CO_2$ partial pressure is used, the $CO_2$ absorption rate of the $CO_2$ absorbent 13B increases in accordance with a decrease in temperature. For this reason, it is desirable to decrease a temperature of the $CO_2$ absorbent 13B in order to efficiently recover $CO_2$ in the flue gas having a low $CO_2$ partial pressure.

Meanwhile, when the flue gas having a high $CO_2$ partial pressure is used as indicated by the solid line of FIG. 2, the $CO_2$ absorption rate has a different tendency from the case where the flue gas having a low $CO_2$ partial pressure is used. When the flue gas having a high $CO_2$ partial pressure is used, the $CO_2$ absorption rate becomes maximal at about 55° C., and the $CO_2$ absorption rate decreases as the temperature falls from 55° C. However, in the embodiment, compared with the case where the flue gas having a low $CO_2$ partial pressure is used, it is possible to improve the $CO_2$ absorption rate in the lower $CO_2$ absorption unit 141A by controlling the temperature of the $CO_2$ absorbent 13B supplied to the lower $CO_2$ absorption unit 141A in an operation state and to decrease the heat amount of the $CO_2$ absorbent 13C in the $CO_2$ absorbent regenerator 15 by decreasing the circulation amount of the $CO_2$ absorbent. Accordingly, energy saving is realized.

As illustrated in FIG. 2, in the $CO_2$ recovery unit 1 according to the embodiment, it is desirable to control the temperature of the $CO_2$ absorbent 13B supplied to the lower $CO_2$ absorption unit 141A in a range equal to or higher than 50° C. and equal to or lower than 60° C. by the control device 101. Accordingly, the $CO_2$ recovery unit 1 can set the temperature of the $CO_2$ absorbent 13B supplied to the lower $CO_2$ absorption unit 141A within an appropriate range. For this reason, it is possible to further improve the $CO_2$ absorption rate of the flue gas 11A by the $CO_2$ absorbent 13B in the lower $CO_2$ absorption unit 141A and to decrease the circulation amount of the $CO_2$ absorbent 13B in accordance with the improved $CO_2$ absorption rate. Thus, it is possible to decrease the amount of the saturated steam S consumed to regenerate the $CO_2$ absorbent 13C. Further, the $CO_2$ recovery unit 1 can set the temperature of the $CO_2$ absorbent 13C supplied to the $CO_2$ absorbent regenerator 15 to an appropriately high temperature and thus an effect of decreasing a steam consumption amount is obtained.

Additionally, in the embodiment, the $CO_2$ partial pressure of the flue gas 11B is desirably equal to or higher than 50 kPa and equal to or lower than 200 kPa. When the $CO_2$ partial pressure is equal to or higher than 50 kPa, the $CO_2$ absorption rate of the lower $CO_2$ absorption unit 141A has a different tendency when the $CO_2$ partial pressure is low (for example, about 10 kPa) as indicated by the solid line of FIG. 2. Further, when the $CO_2$ partial pressure is equal to or lower than 200 kPa, the amount of $CO_2$ in the flue gas 11B can be sufficiently decreased by the $CO_2$ absorber 14. From the viewpoint of improving the above-described operations and effects, the $CO_2$ partial pressure of the flue gas 11B is more desirably 55 kPa or more, further desirably 60 kPa or more, more desirably 150 kPa or less, and further desirably 100 kPa or less. When the above-described fact is taken into consideration, the $CO_2$ partial pressure of the flue gas 11B is more desirably equal to or higher than 55 kPa and equal to or lower than 150 kPa and further desirably equal to or higher than 60 kPa and equal to or lower than 100 kPa.

Figure 3:
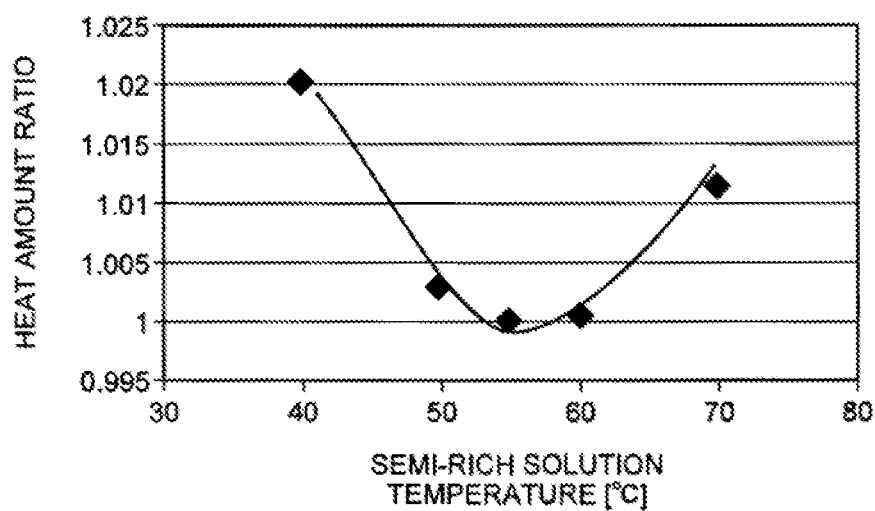
FIG. 3 is a diagram illustrating a relation between a temperature of a $CO_2$ absorbent (a semi-rich solution) supplied to a lower $CO_2$ absorption unit and a ratio of a heat amount necessary to regenerate the $CO_2$ absorbent.

Next, a relation between the temperature of the $CO_2$ absorbent 13B supplied to the lower $CO_2$ absorption unit 141A in the $CO_2$ recovery unit 1 according to the embodiment and the heat amount necessary to regenerate the $CO_2$ absorbent 13 in the $CO_2$ absorbent regenerator 15 will be described with reference to FIG. 3. FIG. 3 is a diagram illustrating a relation between the temperature of the $CO_2$ absorbent 13B (the semi-rich solution) supplied to the lower $CO_2$ absorption unit 141A and a ratio of the heat amount necessary to regenerate the $CO_2$ absorbent 13. Further, in FIG. 3, a horizontal axis indicates the temperature of the $CO_2$ absorbent 13B and a vertical axis indicates the ratio of the heat amount necessary to regenerate $CO_2$. Further, in FIG. 3, the flue gas having a high $CO_2$ partial pressure is displayed as a ratio in which a minimal value of the heat amount necessary to regenerate the $CO_2$ absorbent 13B is 1 in a temperature range equal to or higher than 40° C. and equal to or lower than 70° C. Additionally, a plot indicates an analysis value.

As illustrated in FIG. 3, when the flue gas having a high $CO_2$ partial pressure is used, the heat amount necessary to regenerate the $CO_2$ absorbent 13B in the $CO_2$ absorbent regenerator 15 becomes minimal at about 55° C. and the heat amount necessary to regenerate the $CO_2$ absorbent 13C increases as the temperature falls from 55° C. Thus, in the embodiment, as illustrated in FIG. 2, when the temperature of the $CO_2$ absorbent 13B supplied to the lower $CO_2$ absorption unit 141A is set to a range in which the $CO_2$ absorption rate of the flue gas 11A using the $CO_2$ absorbent 13B of the lower $CO_2$ absorption unit 141A is high, it is possible to decrease the amount of the saturated steam S consumed to regenerate the $CO_2$ absorbent 13C. This is because the circulation amount of the $CO_2$ absorbent 13 can be decreased in accordance with improvement in absorption rate.

Figure 4:
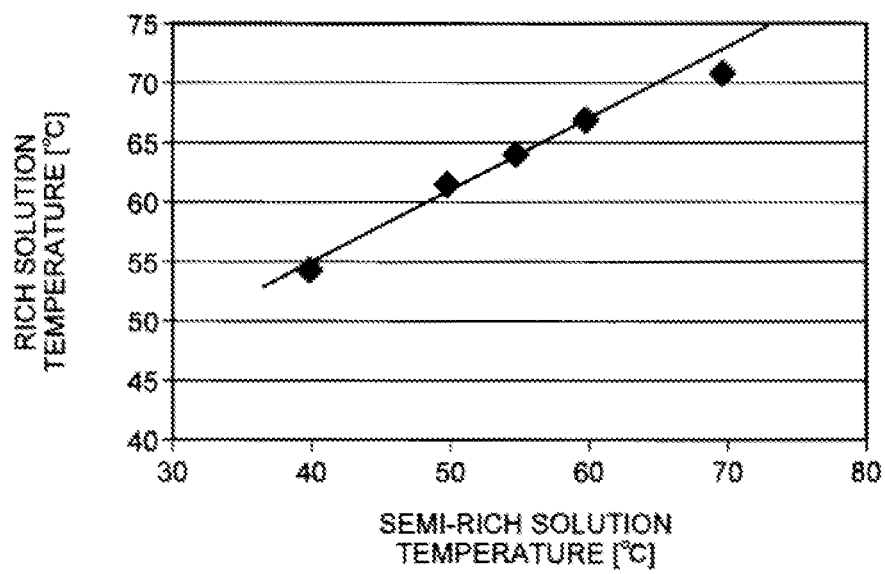
FIG. 4 is a diagram illustrating a relation between a temperature of a $CO_2$ absorbent (a semi-rich solution) supplied to a lower $CO_2$ absorption unit and a temperature of a $CO_2$ absorbent (a rich solution) supplied to a $CO_2$ absorbent regenerator.

FIG. 4 is a diagram illustrating a relation between the temperature of the $CO_2$ absorbent 13B (the semi-rich solution) supplied to the lower $CO_2$ absorption unit 141A and the temperature of the $CO_2$ absorbent 13C (the rich solution) supplied to the $CO_2$ absorbent regenerator 15. Further, in FIG. 4, a vertical axis indicates the temperature of the $CO_2$ absorbent 13C supplied to the $CO_2$ absorbent regenerator 15 and a horizontal axis indicates the temperature of the $CO_2$ absorbent 13B supplied to the lower $CO_2$ absorption unit 141A.

As illustrated in FIG. 4, in the embodiment, there is a direct proportional relation between the temperature of the $CO_2$ absorbent 13B supplied to the lower $CO_2$ absorption unit 141A and the temperature of the $CO_2$ absorbent 13C supplied to the $CO_2$ absorbent regenerator 15. Thus, when the control device 101 controls the amount of the refrigerant supplied to the heat exchanger 24 and the amount of the $CO_2$ absorbent 13B supplied to the lower $CO_2$ absorption unit 141A by the pump 25 so that the temperature of the $CO_2$ absorbent 13C supplied to the $CO_2$ absorbent regenerator 15 is measured by the thermometer 102 and the measured temperature falls within a predetermined range (for example, a range equal to or higher than 62° C. and equal to or lower than 67° C.), it is possible to control the $CO_2$ absorbent 13B of the lower $CO_2$ absorption unit 141A at a desired temperature. Accordingly, it is possible to obtain a high $CO_2$ absorption rate and to decrease a heat amount necessary to heat the $CO_2$ absorbent 13C in the $CO_2$ absorbent regenerator 15.

Figure 5:
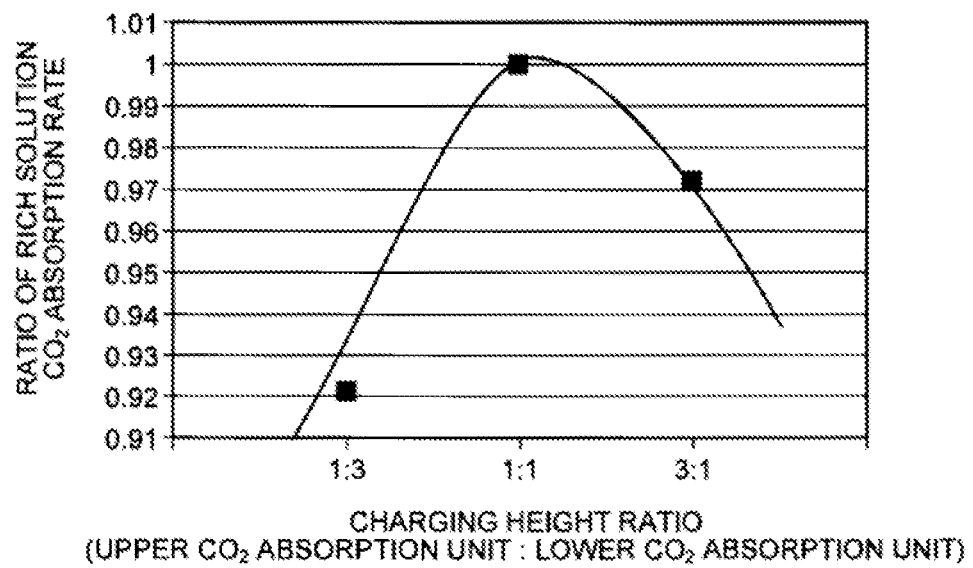
FIG. 5 is a diagram illustrating a relation of filling material charging height ratios of a lower $CO_2$ absorption unit and an upper $CO_2$ absorption unit of a $CO_2$ absorber with respect to a ratio of a $CO_2$ absorption rate of a rich solution.

FIG. 5 is a diagram illustrating a relation of filling material charging height ratios H1 and H2 of the lower $CO_2$ absorption unit and the upper $CO_2$ absorption unit of the $CO_2$ absorber with respect to a ratio of the $CO_2$ absorption rate of the rich solution. Additionally, in FIG. 5, a case where the filling material charging height ratios (the upper $CO_2$ absorption unit 141B:the lower $CO_2$ absorption unit 141A) H1 and H2 of the lower $CO_2$ absorption unit 141A and the upper $CO_2$ absorption unit 141B are changed in a range of 1:3 to 3:1 is displayed at a ratio in which a maximal value of the $CO_2$ absorption rate is 1.

As illustrated in FIG. 5, in the embodiment, when the filling material charging height ratios of the lower $CO_2$ absorption unit 141A and the upper $CO_2$ absorption unit 141B are changed, the $CO_2$ absorption rate changes. For this reason, in the embodiment, it is desirable that the charging height ratio (the upper $CO_2$ absorption unit 141B:the lower $CO_2$ absorption unit 141A) between the charging height of the filling material the filling material H2 in the upper $CO_2$ absorption unit 141B and the charging height of the filling material H1 in the lower $CO_2$ absorption unit 141A be equal to or larger than 1:3 and equal to or smaller than 3:1. Accordingly, since the absorption efficiency for $CO_2$ in the flue gas 11A of the upper $CO_2$ absorption unit 141B and the absorption efficiency for $CO_2$ in the flue gas 11A of the lower $CO_2$ absorption unit 141A are respectively improved, it is possible to further improve a $CO_2$ absorption rate and to save energy. As the charging height ratio, 1:1 is more desirable from the viewpoint of further improving the above-described operations and effects.

Next, an overall operation of the $CO_2$ recovery unit 1 according to the embodiment will be described. The flue gas 11A such as a synthetic gas containing $CO_2$ discharged from the direct reducing furnace is introduced into the cooling tower 12 and is cooled by a counterflow contact with respect to the cooling water $W_1$ to become the flue gas 11B. The cooled flue gas 11B is introduced into the $CO_2$ absorber 14 through a flue gas duct 16 and a flow rate of the flue gas 11B introduced into the $CO_2$ absorber 14 is measured. A counterflow contact occurs between the flue gas 11B introduced into the $CO_2$ absorber 14 and the $CO_2$ absorbent 13 containing alkanolamine in the lower $CO_2$ absorption unit 141A and the upper $CO_2$ absorption unit 141B of the $CO_2$ absorption unit 141 so that $CO_2$ in the flue gas 11B is absorbed to the $CO_2$ absorbent 13 and the flue gas 11D is obtained by removing $CO_2$ therefrom.

The flue gas 11D obtained by removing $CO_2$ therefrom rises through the chimney tray 144B and causes a gas-liquid contact with respect to the washing water $W_2$ supplied from the top portion of the water washing unit 142 so that the flue gas 11E is obtained by recovering the $CO_2$ absorbent 13 accompanied by the flue gas 11D through a circulating and washing process. Mist is the flue gas 11E is trapped by the mist eliminator 145 and the flue gas is discharged to the outside from the tower top portion 14a of the $CO_2$ absorber 14.

The $CO_2$ absorbent 13C having $CO_2$ absorbed thereto in the $CO_2$ absorber 14 exchanges heat with the $CO_2$ absorbent 13 (the lean solution) in the rich-lean solution heat exchanger 52 through the rich solution supply pipe 50 and is supplied to the upper portion of the $CO_2$ absorbent regenerator 15 by the rich solution pump 51. Here, in the embodiment, the $CO_2$ absorbent 13C flowing in the rich solution supply pipe 50 is measured at all times by the thermometer 102 and the measured temperature of the $CO_2$ absorbent 13C is transmitted to the control device 101. The control device 101 adjusts the amount of the refrigerant supplied to the heat exchanger 24 and the amount of the $CO_2$ absorbent 13B supplied to the lower $CO_2$ absorption unit 141A by the pump 25 so that the temperature of the $CO_2$ absorbent 13C measured by the thermometer 102 falls within a predetermined range.

$CO_2$ is removed from the $CO_2$ absorbent 13C supplied to the $CO_2$ absorbent regenerator 15 while the $CO_2$ absorbent 13C flows down to the tower bottom portion through the $CO_2$ absorbent supply unit 151 and thus a semi-lean solution is obtained. This semi-lean solution is circulated in the circulation line $L_4$ by the circulation pump 33 and is heated by the saturated steam S in the regenerating heater 31 so that the $CO_2$ absorbent 13 (the lean solution) is obtained. The heated saturated steam S becomes the steam condensed water $W_4$. The $CO_2$ gas 41 removed from the $CO_2$ absorbent 13 passes through the condenser 42 so that moisture is removed therefrom and is discharged as the $CO_2$ gas 44, from which the condensed water $W_5$ is separated, to the outside from the upper portion of the separation drum 43, The separated condensed water $W_5$ is supplied to the $CO_2$ absorbent regenerator 15 and a part of the water is divided so that the water is supplied to the water washing unit 142 of the $CO_2$ absorber 14 through the re-circulation line $L_{12}$.

The $CO_2$ absorbent 13 (the lean solution) of the tower bottom portion 15b of the $CO_2$ absorbent regenerator 15 exchanges heat with the $CO_2$ absorbent 13C (the rich solution) by the rich-lean solution heat exchanger 52 through the lean solution supply pipe 53 and is supplied to the upper portion of the $CO_2$ absorption unit 141 of the $CO_2$ absorber 14 by the lean solution pump 54. The $CO_2$ absorbent 13 supplied to the $CO_2$ absorption unit 141 absorbs $CO_2$ of the flue gas 11A in the upper $CO_2$ absorption unit 141B to become the $CO_2$ absorbent (the semi-rich solution) 13A and is extracted from the lower portion of the upper $CO_2$ absorption unit 141B to the extraction line $L_{11}$. The extracted $CO_2$ absorbent 13A is cooled to a predetermined temperature range by the heat exchanger 24 to become the $CO_2$ absorbent (the semi-rich solution) 13B and is supplied to the lower $CO_2$ absorption unit 141A by the pump 25 to absorb $CO_2$ in the flue gas 11B by the lower $CO_2$ absorption unit 141A so that the $CO_2$ absorbent (the rich solution) 13C is obtained. The $CO_2$ absorbent (the rich solution) 13C is extracted from the tower bottom portion 14b of the $CO_2$ absorber 14 and is supplied to the $CO_2$ absorbent regenerator 15.

As described above, according to the embodiment, since the temperature of the $CO_2$ absorbent 13B supplied to the lower $CO_2$ absorption unit 141A is controlled based on the temperature of the $CO_2$ absorbent 13C supplied to the $CO_2$ absorbent regenerator 15, the $CO_2$ absorption rate of the flue gas 11B of the lower $CO_2$ absorption unit 141A can be increased. Accordingly, since the $CO_2$ recovery unit 1 has an excellent $CO_2$ absorption rate even when the synthetic gas having a high $CO_2$ partial pressure in the flue gas 11B is treated, energy can be saved.

Additionally, in the above-described embodiment, an example of treating the flue gas 11A such as a synthetic gas containing $CO_2$ discharged from a direct reducing furnace has been described, but the invention can be applied to various gases including a natural gas (a methane gas) containing $CO_2$.

REFERENCE SIGNS LIST 1, 2 $CO_2$ Recovery Unit
11A, 11B, 11C, 11D, 11E Flue Gas
12 Cooling Tower
121 Cooling Unit
122 Heat Exchanger
123 Circulation Pump
124 Adjustment Value
13 $CO_2$ Absorbent (Lean Solution)
13A $CO_2$ Absorbent
13B $CO_2$ Absorbent (Semi-Rich Solution)
13C $CO_2$ Absorbent (Rich Solution)
14 $CO_2$ Absorber
14a Tower Top Portion
14b Tower Bottom Portion
141 $CO_2$ Absorption Unit
142 Water Washing Unit
143A Liquid Storage Unit
143B Chimney Tray
144A Liquid Storage Unit
144B Chimney Tray
145 Mist Eliminator
15 $CO_2$ Absorbent Regenerator
15a Tower Top Portion
151 $CO_2$ Absorbent Supply Unit
16 Flue Gas Duct
21 Heat Exchanger
22 Circulation Pump
23 Adjustment Valve
24 Heat Exchanger
31 Regenerating Heater
32 Adjustment Valve 33 Circulation Pump
41, 44 $CO_2$ Gas
42 Condenser
43 Separation Drum
45 Condensed Water Circulation Pump
46, 47 Adjustment Valve
50 Rich Solution Supply Pipe
51 Rich Solution Pump
52 Rich-Lean Solution Heat Exchanger
53 Lean Solution Supply Pipe
54 Lean Solution Pump
55 Cooling Unit
101 Control Device
102 Thermometer (Temperature Measurement Device)
$L_1$, $L_2$, $L_4$ Circulation Line
$L_3$, $L_{11}$ Extraction Line
$L_5$ Gas Discharge Line
$L_6$ Condensed Water Line
$L_{12}$ Re-Circulation Line
S Saturation Steam
$W_1$ Cooling Water
$W_2$, $W_3$ Washing Water
$W_4$ Steam Condensed Water
$W_5$ Condensed Water

The invention claimed is:

1. A $CO_2$ recovery method comprising:
obtaining a first $CO_2$ absorbent by causing a $CO_2$ containing gas to be treated to contact a $CO_2$ absorbent in a first $CO_2$ absorption unit of a $CO_2$ absorber so that $CO_2$ contained in the gas to be treated is absorbed to the $CO_2$ absorbent and obtaining a second $CO_2$ absorbent by causing the first $CO_2$ absorbent to contact the $CO_2$ containing gas to be treated in a second $CO_2$ absorption unit of the $CO_2$ absorber so that $CO_2$ contained in the gas to be treated is absorbed to the first $CO_2$ absorbent;
regenerating the $CO_2$ absorbent by heating the second $CO_2$ absorbent in a $CO_2$ absorbent regenerator so that $CO_2$ is discharged from the $CO_2$ absorbent; and
measuring a temperature of the second $CO_2$ absorbent supplied from the $CO_2$ absorber to the $CO_2$ absorbent regenerator and controlling a temperature of the first $CO_2$ absorbent supplied to the second $CO_2$ absorption unit based on the measured temperature of the second $CO_2$ absorbent, wherein
controlling the temperature of the first $CO_2$ absorbent supplied to the second $CO_2$ absorption unit such that the measured temperature of the second $CO_2$ absorbent is in a range of 62° C. to 67° C.,
wherein a $CO_2$ partial pressure of the $CO_2$ containing gas to be treated is in a range of 50 kPa to 200 kPa.

2. The $CO_2$ recovery method according to claim 1,
wherein the temperature of the first $CO_2$ absorbent supplied to the second $CO_2$ absorption unit is controlled so that the temperature is in the range of 50° C. to 60° C.

3. The $CO_2$ recovery method according to claim 1,
wherein a ratio (the first $CO_2$ absorption unit:the second $CO_2$ absorption unit) between a filling material charging height in the first $CO_2$ absorption unit and a filling material charging height in the second $CO_2$ absorption unit is in the range of 1:3 to 3:1.

* * * * *